(12) United States Patent
Dragomir-Daescu et al.

(10) Patent No.: US 6,789,028 B2
(45) Date of Patent: Sep. 7, 2004

(54) METHOD, SYSTEM, AND COMPUTER-READABLE MEDIUM FOR SENSORLESS MEASUREMENT OF INDUCTION MACHINE ROTOR BAR PASS FREQUENCY

(75) Inventors: Dan Michael Dragomir-Daescu, Niskayuna, NY (US); Gerald Burt Kliman, Niskayuna, NY (US); Harindra Rajiyah, Clifton Park, NJ (US); Abdulrahman Abdallah Al-Khalidy, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 76 days.

(21) Appl. No.: 10/245,242

(22) Filed: Sep. 18, 2002

(65) Prior Publication Data

US 2004/0054485 A1 Mar. 18, 2004

(51) Int. Cl.[7] .............................. G01P 3/54; G06F 19/00
(52) U.S. Cl. ........................................... 702/70; 702/66
(58) Field of Search ................................ 324/160, 166, 324/772, 545; 702/145, 66, 70

(56) References Cited

U.S. PATENT DOCUMENTS

| | | | | |
|---|---|---|---|---|
| 4,541,281 A | * | 9/1985 | Chubachi et al. ............. 73/606 |
| 5,049,815 A | * | 9/1991 | Kliman ....................... 324/772 |
| 5,519,337 A | * | 5/1996 | Casada ........................ 324/772 |
| 5,530,343 A | * | 6/1996 | Bowers et al. .............. 324/173 |
| 5,828,210 A | * | 10/1998 | Kliman et al. .............. 324/173 |
| 6,208,132 B1 | * | 3/2001 | Kliman et al. .............. 324/177 |
| 6,449,567 B1 | * | 9/2002 | Desai et al. .................. 702/58 |

OTHER PUBLICATIONS

"A Summary of AC Induction Motor Monitoring", Bob Jones, 6–97, SKF Conditon Monitoring.*
K. D. Hurst, et al, "a Comparison of Spectrum Estimtion Techniques or Sensorless Speed Detection in Induction Machines", IEEE Trans. on Industry Applications, vol. 33, No. 4, Jul./Aug. 1997, pp 898–905.

* cited by examiner

*Primary Examiner*—Marc S. Hoff
*Assistant Examiner*—Paul L Kim
(74) *Attorney, Agent, or Firm*—Ann M. Agosti; Patrick K. Patnode

(57) ABSTRACT

A method comprises: sampling a current waveform of an induction machine to obtain sampled points; characterizing the sampled current over a selected first time window to obtain characterized points; subtracting the characterized points from respective sampled points to obtain a residual signal comprising residual points; obtaining a frequency spectrum representative of the residual signal over a selected second time window; and identifying a rotor bar pass frequency from the frequency spectrum. The method is typically carried out by a system comprising a computer, a computer-readable medium, or combinations thereof.

52 Claims, 5 Drawing Sheets

METHOD, SYSTEM, AND COMPUTER-READABLE MEDIUM FOR SENSORLESS MEASUREMENT OF INDUCTION MACHINE ROTOR BAR PASS FREQUENCY

BACKGROUND

Speed control systems for induction motors typically include speed sensors. Due to the increased cost associated with speed sensors, industrial motors are often not equipped with speed sensors. However, knowing the speed or being able to use a signal to control speed of industrial motors is useful.

One approach to sensorless estimation of motor speed has been to look for the rotor bar pass frequency (BPF) in the motor current. BPF is the product of the motor's rotor shaft speed (MS) and the number of rotor bars (N) in the rotor cage. Unfortunately many combinations of rotor poles and slotting result in very small amplitude of the BPF such that the relevant signal becomes lost in the welter of noise and other harmonics. In motors where the BPF is more readily detectable, long sampling times and complex computations are required to precisely determine bar pass frequency. The time periods typically range from a few seconds to about ten seconds. Thus, these techniques are only applicable to slow speed control systems.

It would be desirable to provide a method of sensorless speed sensing by the analysis of motor current that is accomplished without requiring long sampling times and complex computation.

BRIEF DESCRIPTION

Briefly, in accordance with one embodiment of the present invention, a method comprises: sampling a current waveform of an induction machine to obtain sampled points; characterizing the sampled current over a selected first time window to obtain characterized points; subtracting the characterized points from respective sampled points to obtain a residual signal comprising residual points; obtaining a frequency spectrum representative of the residual signal over a selected second time window; and identifying a rotor bar pass frequency from the frequency spectrum.

In accordance with another embodiment of the present invention, a system comprises a computer configured for: sampling a current waveform of an induction machine to obtain sampled points; characterizing the sampled current over a selected first time window to obtain characterized points; subtracting the characterized points from respective sampled points to obtain a residual signal comprising residual points; obtaining a frequency spectrum representative of the residual signal over a selected second time window; and identifying a rotor bar pass frequency from the frequency spectrum.

In accordance with another embodiment of the present invention, a computer-readable medium stores computer instructions for instructing a computer. The computer instructions comprise: sampling a current waveform of an induction machine to obtain sampled points; characterizing the sampled current over a selected first time window to obtain characterized points; subtracting the characterized points from respective sampled points to obtain a residual signal comprising residual points; obtaining a frequency spectrum representative of the residual signal over a selected second time window; and identifying a rotor bar pass frequency from the frequency spectrum.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
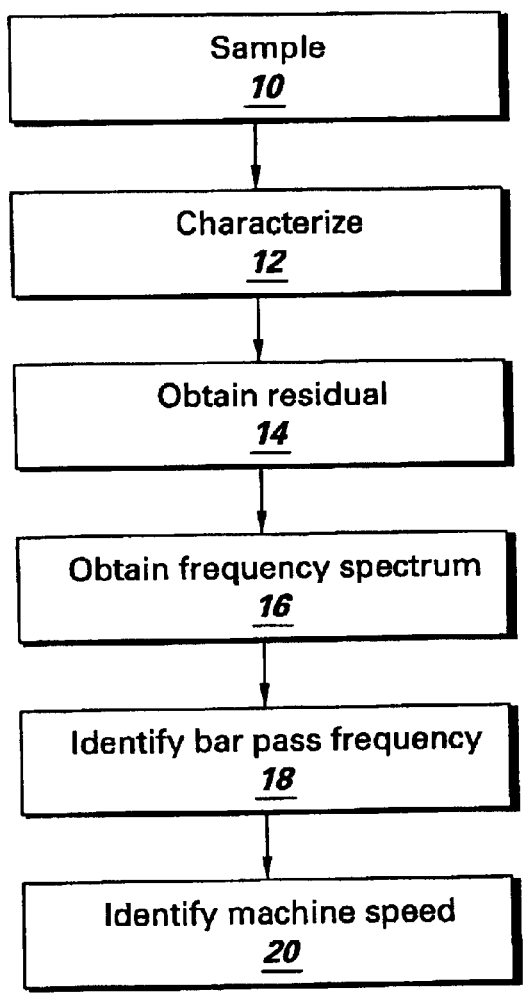
FIG. 1 is a flow chart of a method for sensorless measurement of induction machine speed in accordance with one embodiment of the present invention.
Figure 2:
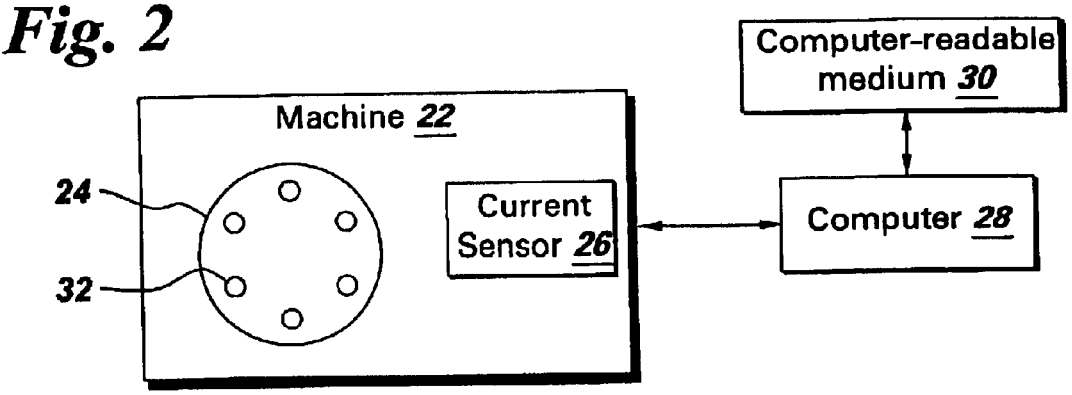
FIG. 2 is a block diagram of an induction machine.

In accordance with one embodiment of the present invention, as illustrated by the flow chart of FIG. 1 and the block diagram of FIG. 2, a method for sensorless measurement of induction machine 22 bar pass frequency comprises: sampling 10 a current waveform of induction machine 22 to obtain sampled points; characterizing 12 the sampled current over a selected first time window to obtain characterized points; subtracting the characterized points from respective sampled points to obtain a residual signal 14 comprising residual points; obtaining a frequency spectrum 16 representative of the residual signal over a selected second time window; and identifying a rotor bar 32 pass frequency 18 from the frequency spectrum. In one embodiment, the rotor bar pass frequency is used to obtain the induction machine speed 20.

Although, for ease of illustration, the present invention is primarily described in the context of a method, the present invention is additionally applicable in the context of a system comprising a computer 28 configured for carrying out the method as well as in the context of a computer-readable medium 30 storing computer instructions for instructing a computer to in accordance with the method.

Induction machine 22 may comprise a motor or a generator, for example. "Induction machine speed" refers to the speed of a shaft of a rotor 24 of induction machine 22. Computer 28 may comprise one or more digital or analog processors or combinations thereof.

Figure 3:
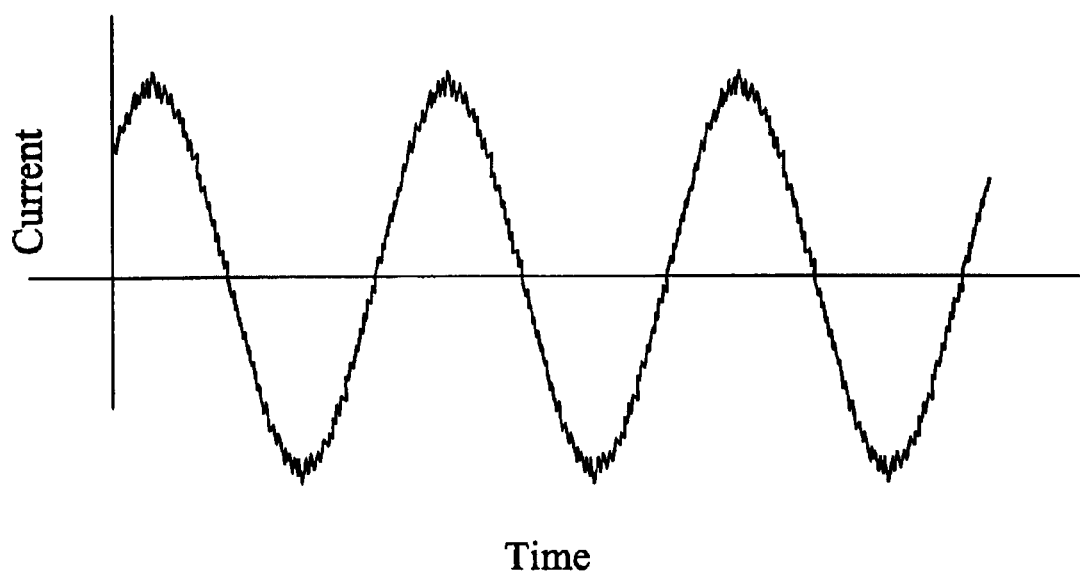
FIG. 3 is an example graph of a current waveform of an induction machine.
Figure 4:
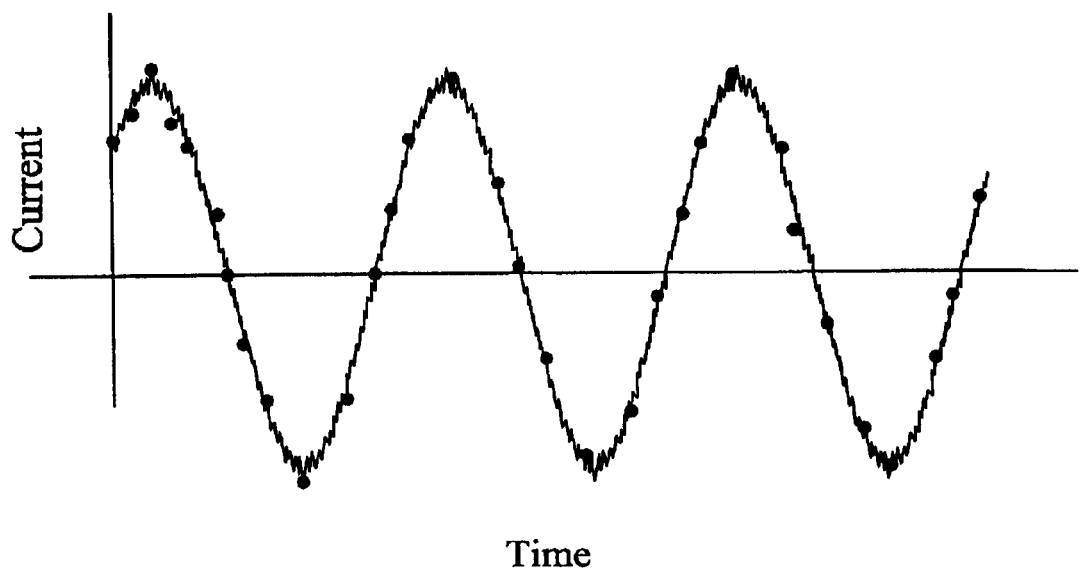
FIG. 4 is an example graph of a sampled current waveform.

FIG. 3 is an example graph of a current waveform of induction machine 22, and FIG. 4 is an example graph of a sampled current waveform. In one embodiment, the current waveform of FIG. 3 is obtained by a current sensor 26 (FIG. 2) situated for measuring current on an output line (not shown) of induction machine 22.

Sampling of the current waveform typically occurs at a sampling frequency higher than a fundamental frequency of induction machine 22. In a more specific embodiment, sampling occurs at a sampling frequency of at least about one hundred times the fundamental frequency. In a still more specific example, the fundamental frequency comprises 60 Hz, and the sampling frequency comprises 20 kilo Hz. For ease of illustration, FIGS. 4 and 5 are shown with sampling at a lower rate than would typically be used.

Figure 5:
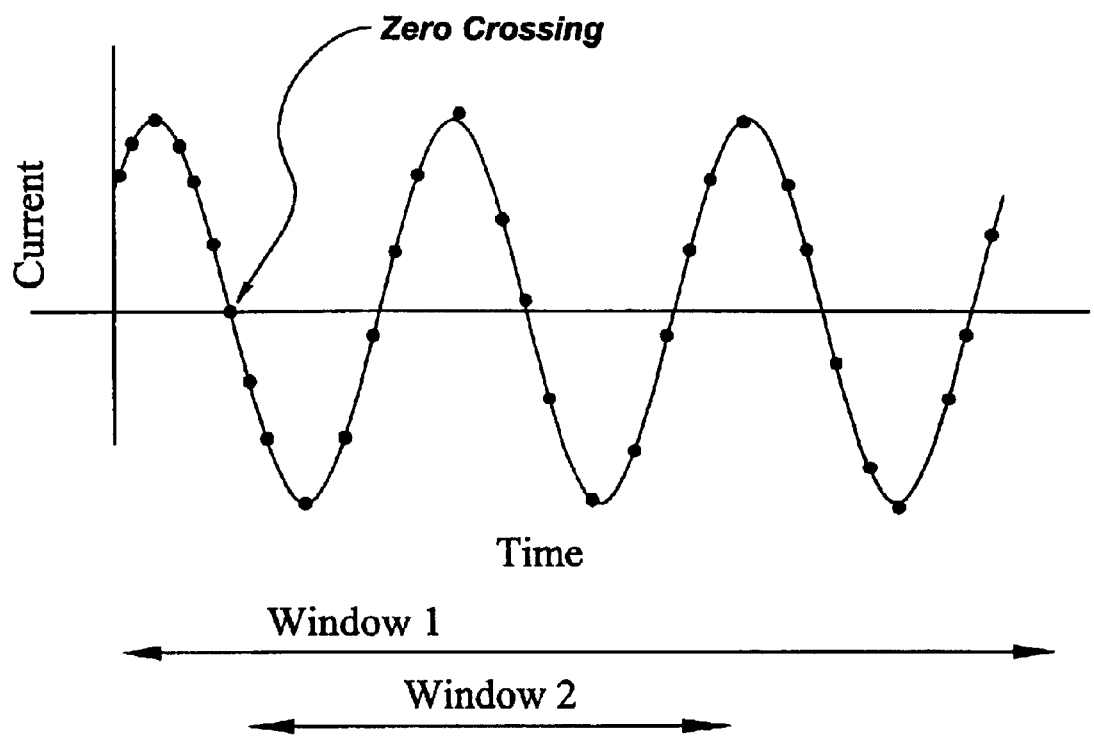
FIG. 5 is an example graph of a characterized current waveform.

FIG. 5 is an example graph of a characterized current waveform. In one embodiment, characterizing comprises using neighboring sample points for averaging each of the sample points. In one embodiment wherein the sampling frequency is 20 kilohertz the number of neighboring points used for averaging a sample points is on the order of about 10 to about 200 points. In several more specific embodiments, characterizing comprises using a technique selected from the group consisting of Fourier series fitting, moving average filtering, envelope detection, wavelet analysis, or any low pass filtering technique without signal phase shifting.

FIG. 5 additionally illustrates sample first and second time windows. The first and second time windows may comprise identical time windows. However, the second time window is typically shorter and within the first time window so that the characterization can be done for each point in the second time window with adequate sample points on either side of the second time window. In one embodiment, the first time window comprises a multiple of a fundamental period of induction machine 22.

In one embodiment, a beginning of the second time window is defined by a selected point. In more specific alternative embodiments, the selected point comprises a beginning of the first time window, or the selected point comprises a zero crossing within the first time window. A length of the second time window typically ranges from about 3 to about 6 periods of the fundamental frequency of induction machine 22.

Figure 6:
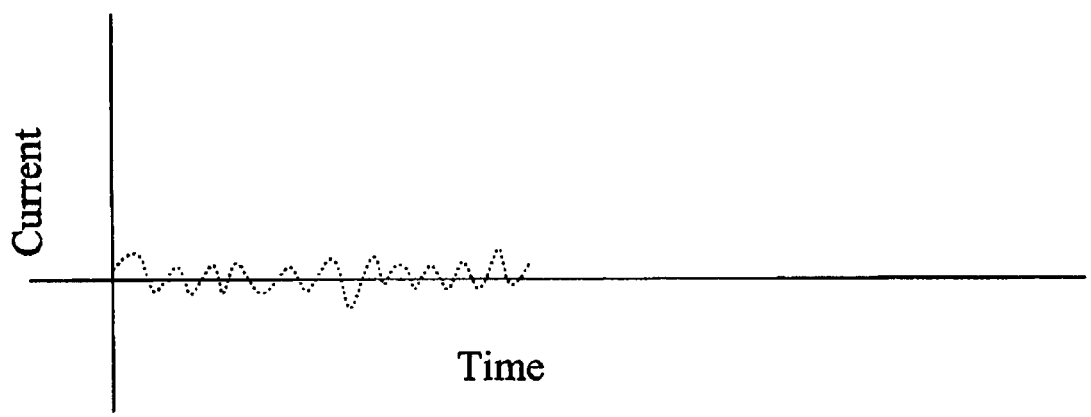
FIG. 6 is an example graph of a residual signal representing a subtraction of the characterized current waveform from the sampled current waveform.
Figure 7:
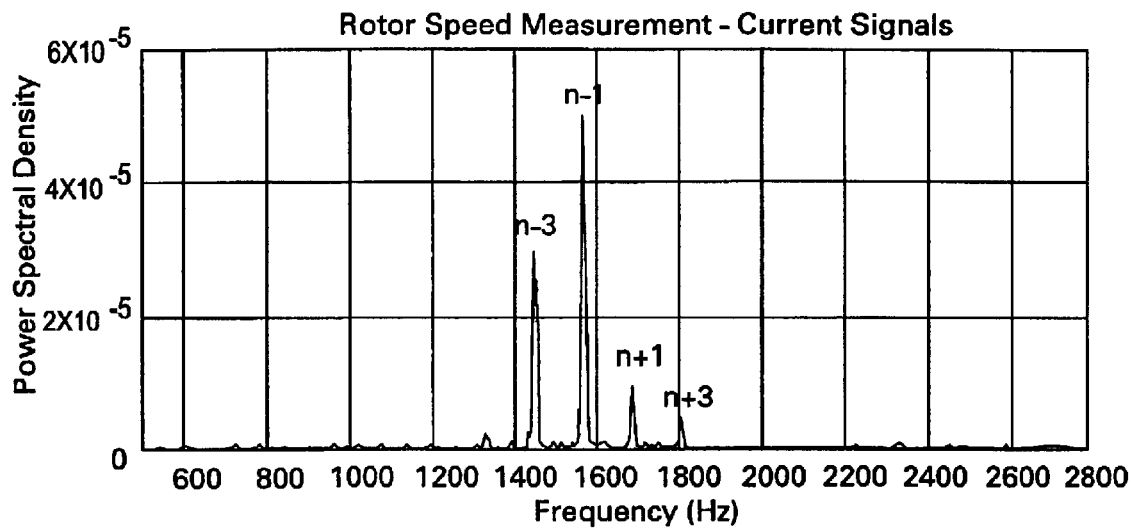
FIGS. 7–10 are example graphs of frequency spectra of the residual signal.

FIG. 6 is an example graph of a residual signal representing a subtraction of the characterized current waveform from the sampled current waveform, and FIG. 7 is an example graph of a frequency spectrum of the residual signal. The residual signal which remains after the subtraction includes only high frequency (very short time scale) components.

In one embodiment, obtaining a frequency spectrum representative of the residual signal comprises obtaining a frequency spectrum of the residual signal. In an alternative embodiment, obtaining a frequency spectrum representative of the residual signal comprises: autocorrelating the residual signal to obtain an autocorrelation function of the residual signal; and obtaining a frequency spectrum of the autocorrelation function of the residual signal with the frequency spectrum comprising a power spectral density.

As compared with obtaining the frequency spectrum directly, autocorrelation prior to obtaining the frequency spectrum improves signal resolution at the expense of additional computational requirements. In either embodiment, techniques such as fast Fourier transforms are useful for obtaining the frequency spectrum.

One embodiment for identifying the rotor bar 32 pass frequency comprises obtaining at least one significant side band of an approximate bar pass frequency and obtaining the rotor bar pass frequency from the at least one significant side band.

In one embodiment, the approximate bar pass frequency is obtained or identified by multiplying an approximate speed by the number of rotor bars 32 of induction machine 22. An approximate speed can be estimated by using the nominal speed of induction machine 22. Because induction machines typically have low slip, the actual speed (mechanical frequency) is only a percent or so less than the line frequency (synchronous speed). The true speed may be identified within about 0.1%–0.5% in about 50–100 milliseconds which may then be used in a medium fast speed control.

For many induction machines, the nominal speed is 60 Hz, for example. If induction machine 22 has "N" bars 32, the resulting approximate bar pass frequency is 60*N. If there are 28 rotor bars, than 28*60 results in an approximate bar pass frequency of 1680 Hz.

Figure 8:
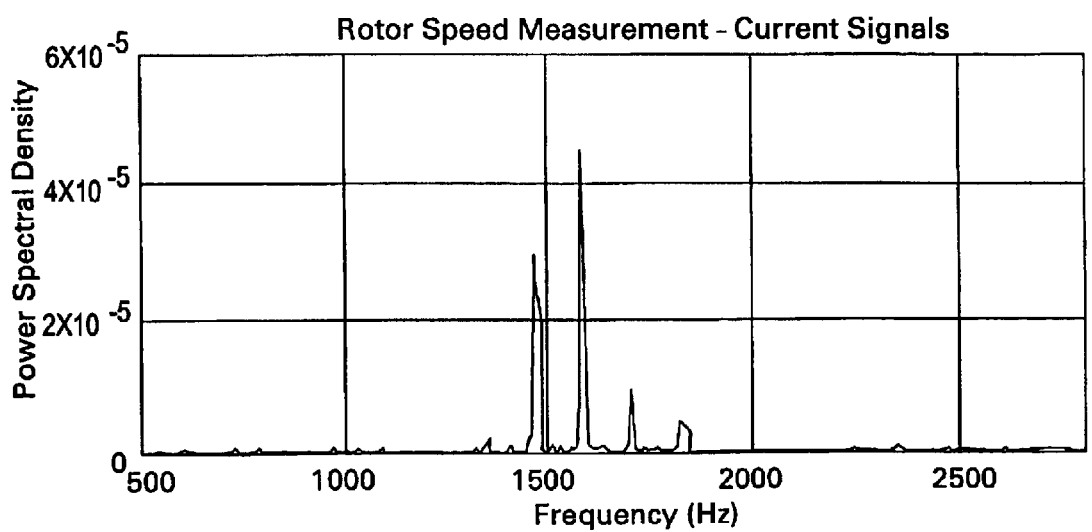
Figure 9:
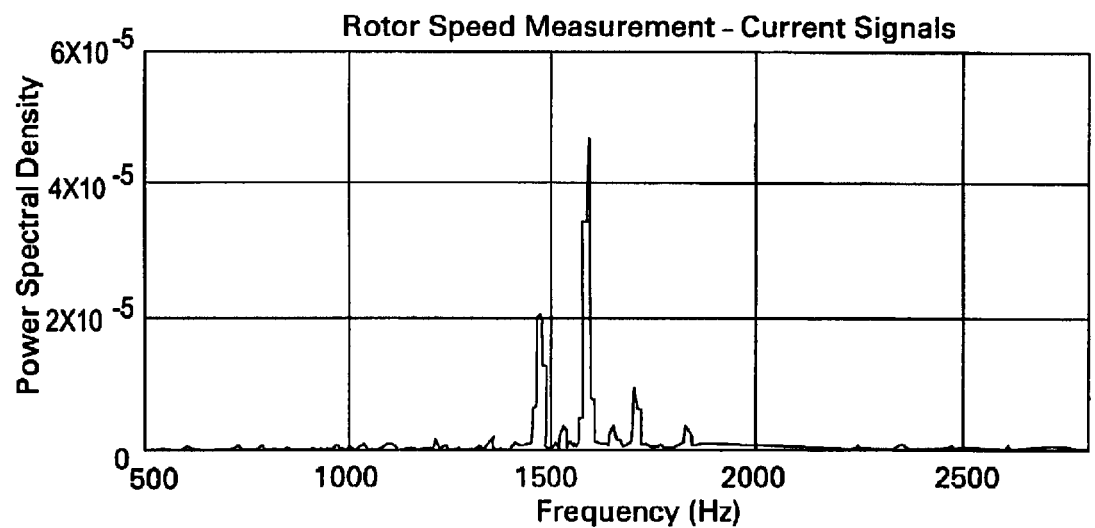
Figure 10:
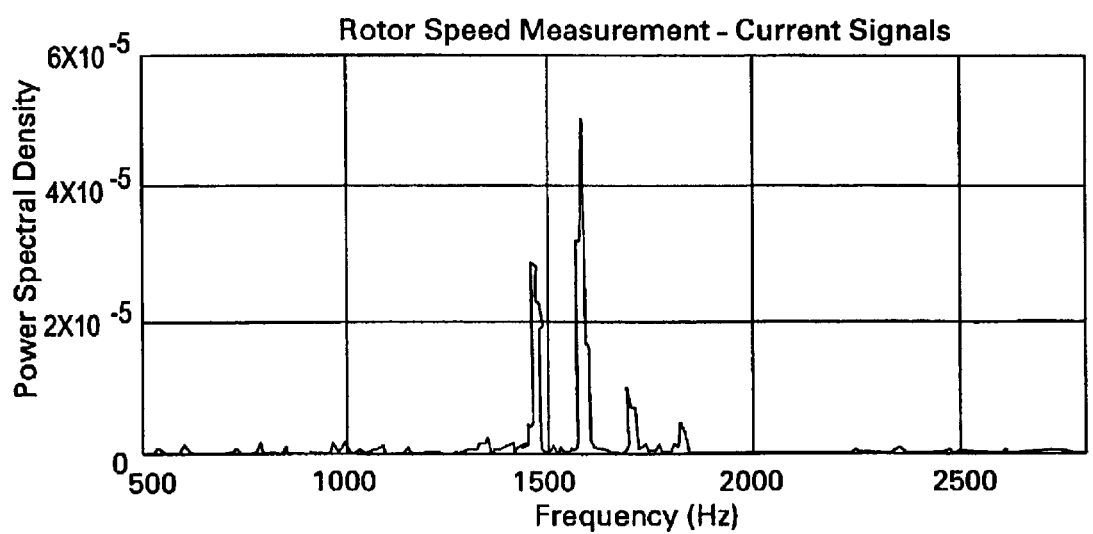

The method has been tested on a set of four small single-phase motors driving a positive displacement (piston) compressor using the autocorrelation embodiment for obtaining the frequency spectrum. FIG. 7 represents three spectra of power spectral density lines associated with the bar pass frequency which were obtained from repeated measurements (shown in FIGS. 8–10) to show consistency. The spectral lines (sidebands) are clearly defined in comparison with the neighboring noise floor. This embodiment of the present invention appears to be selective and accurate in motor speed measurement.

In one embodiment, at least two significant side bands of the approximate bar pass frequency are obtained, and the rotor bar pass frequency is obtained by obtaining rotor bar pass frequency estimates from each of the at least two significant side bands and averaging the rotor bar frequency estimates.

For ease of illustration, the sidebands in FIG. 7 are labeled N−1, N+1, N−3, and N+3. The sideband N−1 appears to be at about 1580 Hz, the sideband N−3 appears to be at about 1460 Hz, the sideband N+1 appears to be at about 1700 Hz, and the sideband N+3 appears to be at about 1820 Hz. A respective estimated bar pass frequency (BPF) can be calculated by:

$$BPF=(A/A_k)*(F_k),$$

wherein A represents the number (N) of rotor bars, $A_K$ represents the number associated with the sideband (N+1, N−1, etc.), and $F_k$ represents the respective frequency associated with the sideband. Thus, for the N−1 sideband, BPF is 1638.52 Hz (1580*28/(28−1)). Likewise, for the N+1 sideband, BPF is 1641.38 Hz; for the N−3 sideband, BPF is 1635.20 Hz; and for the N+3 sideband, BPF is 1643.87 Hz. The average of these four BPF estimates is then 1639.74 Hz. Dividing this average by 28 rotor bars yields an induction machine speed (MS) estimate of 58.56 Hz.

In another embodiment, at least two significant side bands of the approximate bar pass frequency are obtained, induction machine speed estimates are obtained from each of the at least two significant side bands, and the induction machine speed estimates are averaged to obtain the induction machine speed.

The estimated induction machine speed (MS) can be calculated by:

$$MS=(F_k)/A_k.$$

Thus the N−1 sideband MS=58.52 Hz, the N−3 sideband MS=58.40 Hz, the N+1 sideband MS=58.62 Hz, and the N+3 sideband=58.71 Hz. These estimated MS's average to 58.56 Hz.

The previously described embodiments of the present invention have many advantages, including providing a method of remote sensorless speed sensing by the analysis of induction machine current that will work on all induction machines of any size, oscillatory load, geometry and number of phases.

Specific options have been described above for carrying out the more generic embodiments of the present invention. These options can be combined in any desired manner. In one specific embodiment, for example, a method for sensorless measurement of induction machine 22 speed comprises: sampling a current waveform of the induction machine at a sampling frequency higher than a fundamental frequency of the induction machine to obtain sampled points; characterizing the sampled current over a selected first time window comprising a multiple of a fundamental period of the induction machine to obtain characterized points; subtracting the characterized points from respective sampled points to obtain a residual signal comprising residual points; obtaining a frequency spectrum representative of the residual signal over a selected second time window, wherein a beginning of the second time window is defined by a selected point; identifying a rotor bar pass frequency from the frequency spectrum; multiplying an approximate speed by the number of rotor bars of the machine to obtain an approximate bar pass frequency; obtaining at least one significant side band of the approximate bar pass frequency; and obtaining the rotor bar pass frequency from the at least one significant side band.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method comprising:

(a) sampling a current waveform of an induction machine to obtain sampled points;

(b) characterizing the sampled current over a selected first time window to obtain characterized points;

(c) subtracting the characterized points from respective sampled points to obtain a residual signal comprising residual points;

(d) obtaining a frequency spectrum representative of the residual signal over a selected second time window; and (e) identifying a rotor bar pass frequency from the frequency spectrum.

2. The method of claim 1 further comprising (f) obtaining an induction machine speed from the rotor bar pass frequency.

3. The method of claim 1 wherein sampling the current waveform occurs at a sampling frequency higher than a fundamental frequency of the induction machine.

4. The method of claim 3 wherein sampling occurs at a sampling frequency of at least about one hundred times the fundamental frequency.

5. The method of claim 1 wherein the first time window comprises a multiple of a fundamental period of the induction machine.

6. The method of claim 5 wherein characterizing comprises using neighboring sample points for averaging each of the sample points.

7. The method of claim 6 wherein characterizing comprises using a technique selected from the group consisting of Fourier series fitting, moving average filtering, and envelope detection.

8. The method of claim 1 wherein a beginning of the second time window is defined by a selected point.

9. The method of claim 8 wherein the selected point comprises a zero crossing within the first time window.

10. The method of claim 1 wherein a length of the second time window is about 3 to about 6 periods of a fundamental frequency of the induction machine.

11. The method of claim 1 wherein obtaining a frequency spectrum representative of the residual signal comprises obtaining a frequency spectrum of the residual signal.

12. The method of claim 1 wherein obtaining a frequency spectrum representative of the residual signal comprises (i) autocorrelating the residual signal to obtain an autocorrelation function of the residual signal; and (ii) obtaining a frequency spectrum of the autocorrelation function of the residual signal, the frequency spectrum comprising a power spectral density.

13. The method of claim 1 wherein (e) comprises obtaining at least one significant side band of an approximate bar pass frequency and obtaining the rotor bar pass frequency from the at least one significant side band.

14. The method of claim 13 wherein (e) comprises obtaining at least two significant side bands of the approximate bar pass frequency, obtaining rotor bar pass frequency estimates from each of the at least two significant side bands, and averaging the rotor bar frequency estimates.

15. The method of claim 13 wherein (e) comprises obtaining at least two significant side bands of the approximate bar pass frequency, and further comprising (f) obtaining an induction machine speed from the rotor bar pass frequency, wherein (f) comprises obtaining induction machine speed estimates from each of the at least two significant side bands and averaging the induction machine speed estimates to obtain the induction machine speed.

16. A method for sensorless measurement of induction machine (22) speed, the method comprising:

(a) sampling a current waveform of the induction machine at a sampling frequency higher than a fundamental frequency of the induction machine to obtain sampled points;

(b) characterizing the sampled current over a selected first time window comprising a multiple of a fundamental period of the induction machine to obtain characterized points;

(c) subtracting the characterized points from respective sampled points to obtain a residual signal comprising residual points;

(d) obtaining a frequency spectrum representative of the residual signal over a selected second time window, wherein a beginning of the second time window is defined by a selected point;

(e) multiplying an approximate speed by the number of rotor bars of the machine to obtain an approximate bar pass frequency;

(f) obtaining at least one significant side band of the approximate bar pass frequency; and (g) obtaining a rotor bar pass frequency from the at least one significant side band.

(h) obtaining an induction machine speed from the rotor bar pass frequency.

17. The method of claim 16 wherein sampling occurs at a sampling frequency of at least about one hundred times the fundamental frequency.

18. The method of claim 17 wherein characterizing comprises using neighboring sample points for averaging each of sample points.

19. The method of claim 18 wherein characterizing comprises using a technique selected from the group consisting of Fourier series fitting, moving average filtering, and envelope detection.

20. The method of claim 18 wherein the selected point comprises a beginning of the first time window.

21. The method of claim 18 wherein the selected point comprises a zero crossing within the first time window.

22. The method of claim 18 wherein a length of the second time window is about 3 to about 6 periods of a fundamental frequency of the induction machine.

23. The method of claim 16 wherein obtaining a frequency spectrum representative of the residual signal comprises obtaining a frequency spectrum of the residual signal.

24. The method of claim 16 wherein obtaining a frequency spectrum representative of the residual signal comprises (i) autocorrelating the residual signal to obtain an autocorrelation function of the residual signal; and (ii) obtaining a frequency spectrum of the autocorrelation function of the residual signal, the frequency spectrum comprising a power spectral density.

25. The method of claim 16 wherein (f) comprises obtaining at least two significant side bands of the approximate bar pass frequency, and wherein (g) comprises obtaining rotor bar pass frequency estimates from each of the at least two significant side bands and averaging the rotor bar frequency estimates to obtain the rotor bar pass frequency.

26. The method of claim 16 wherein (f) comprises obtaining at least two significant side bands of the approximate bar pass frequency, and wherein (h) comprises obtaining induction machine speed estimates from each of the at least two significant side bands and averaging the induction machine speed estimates to obtain the induction machine speed.

27. A system comprising a computer configured for:
(a) sampling a current waveform of an induction machine to obtain sampled points;
(b) characterizing the sampled current over a selected first time window to obtain characterized points;
(c) subtracting the characterized points from respective sampled points to obtain a residual signal comprising residual points;
(d) obtaining a frequency spectrum representative of the residual signal over a selected second time window; and
(e) identifying a rotor bar pass frequency from the frequency spectrum.

28. The system of claim 27 wherein the computer is further configured for (f) obtaining an machine speed from the rotor bar pass frequency.

29. The system of claim 27 wherein the computer is configured for sampling the current waveform at a sampling frequency higher than a fundamental frequency of the induction machine.

30. The system of claim 27 wherein the first time window comprises a multiple of a fundamental period of the induction machine.

31. The system of claim 30 wherein characterizing comprises using neighboring sample points for averaging each of the sample points.

32. The system of claim 27 wherein a beginning of the second time window is defined by a selected point.

33. The system of claim 32 wherein the selected point is a zero crossing within the first time window.

34. The system of claim 27 wherein a length of the second time window is about 3 to about 6 periods of a fundamental frequency of the induction machine.

35. The system of claim 27 wherein obtaining a frequency spectrum representative of the residual signal comprises obtaining a frequency spectrum of the residual signal.

36. The system of claim 27 wherein obtaining a frequency spectrum representative of the residual signal comprises (i) autocorrelating the residual signal to obtain an autocorrelation function of the residual signal; and (ii) obtaining a frequency spectrum of the autocorrelation function of the residual signal, the frequency spectrum comprising a power spectral density.

37. The system of claim 27 wherein (e) comprises obtaining at least one significant side band of an approximate bar pass frequency, and obtaining the rotor bar pass frequency from the at least one significant side band.

38. The system of claim 37 wherein (e) comprises obtaining at least two significant side bands of the approximate bar pass frequency, obtaining rotor bar pass frequency estimates from each of the at least two significant side bands, and averaging the rotor bar frequency estimates to obtain the rotor bar pass frequency.

39. The system of claim 37 wherein (e) comprises obtaining at least two significant side bands of the approximate bar pass frequency, and wherein the computer is further configured for (f) obtaining an induction machine speed from the rotor bar pass frequency by obtaining induction machine speed estimates from each of the at least two significant side bands and averaging the induction machine speed estimates.

40. A computer-readable medium storing computer instructions for instructing a computer, the computer instructions comprising:
(a) sampling a current waveform of an induction machine to obtain sampled points;
(b) characterizing the sampled current over a selected first time window to obtain characterized points;
(c) subtracting the characterized points from respective sampled points to obtain a residual signal comprising residual points;
(d) obtaining a frequency spectrum representative of the residual signal over a selected second time window; and
(e) identifying a rotor bar pass frequency from the frequency spectrum.

41. The medium of claim 40 wherein the instructions further comprise (f) obtaining an induction machine speed from the rotor bar pass frequency.

42. The medium of claim 40 wherein the instructions comprise sampling the current waveform at a sampling frequency higher than a fundamental frequency of the induction machine.

43. The medium of claim 40 wherein the first time window comprises a multiple of a fundamental period of the induction machine.

44. The medium of claim 43 wherein the instructions comprise characterizing by using neighboring sample points for averaging each of the sample points.

45. The medium of claim 40 wherein a beginning of the second time window is defined by a selected point.

46. The medium of claim 45 wherein the selected point comprises a zero crossing within the first time window.

47. The medium of claim 40 wherein a length of the second time window is about 3 to about 6 periods of a fundamental frequency of the induction machine.

48. The medium of claim 40 wherein the instructions comprise obtaining a frequency spectrum representative of the residual signal by obtaining a frequency spectrum of the residual signal.

49. The medium of claim 40 wherein the instructions comprise obtaining a frequency spectrum representative of the residual signal by (i) autocorrelating the residual signal to obtain an autocorrelation function of the residual signal; and (ii) obtaining a frequency spectrum of the autocorrelation function of the residual signal, the frequency spectrum comprising a power spectral density.

50. The medium of claim 40 wherein the instructions comprise identifying the rotor bar pass frequency by obtaining at least one significant side band of an approximate bar pass frequency, and obtaining the rotor bar pass frequency from the at least one significant side band.

51. The medium of claim 50 wherein (e) comprises obtaining at least two significant side bands of the approximate bar pass frequency, obtaining rotor bar pass frequency estimates from each of the at least two significant side bands, and averaging the rotor bar frequency estimates to obtain the rotor bar pass frequency.

52. The medium of claim 50 wherein (e) comprises obtaining at least two significant side bands of the approximate bar pass frequency, and wherein the instructions further comprise (f) obtaining an induction machine speed from the rotor bar pass frequency by obtaining induction machine speed estimates from each of the at least two significant side bands and averaging the induction machine speed estimates.

* * * * *